Jan. 10, 1967 R. H. W. KROEKEL 3,296,803

STORAGE TANK FOR DISCHARGING FLUIDS IN A BLEND

Filed May 20, 1963 3 Sheets-Sheet 1

INVENTOR.
ROLF HEINZ WERNER KROEKEL
BY
William Frederick Werner
ATTORNEY

Jan. 10, 1967  R. H. W. KROEKEL  3,296,803
STORAGE TANK FOR DISCHARGING FLUIDS IN A BLEND
Filed May 20, 1963  3 Sheets-Sheet 2
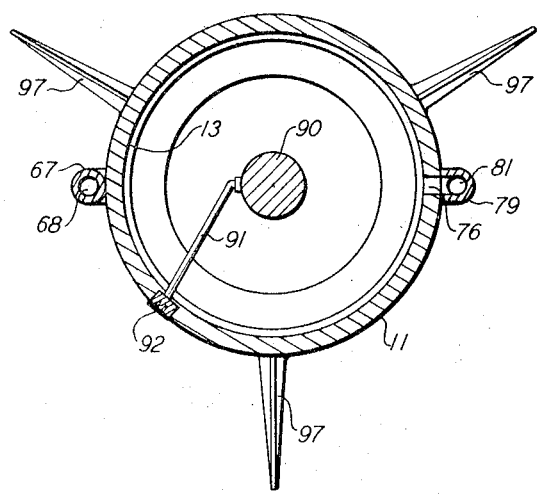
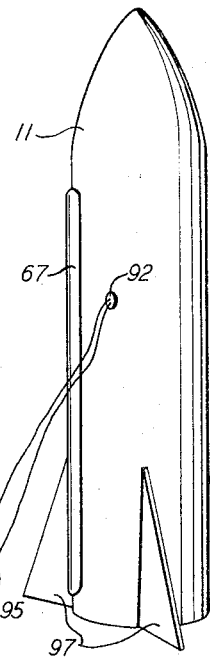
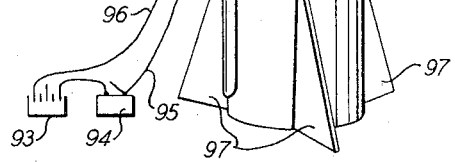
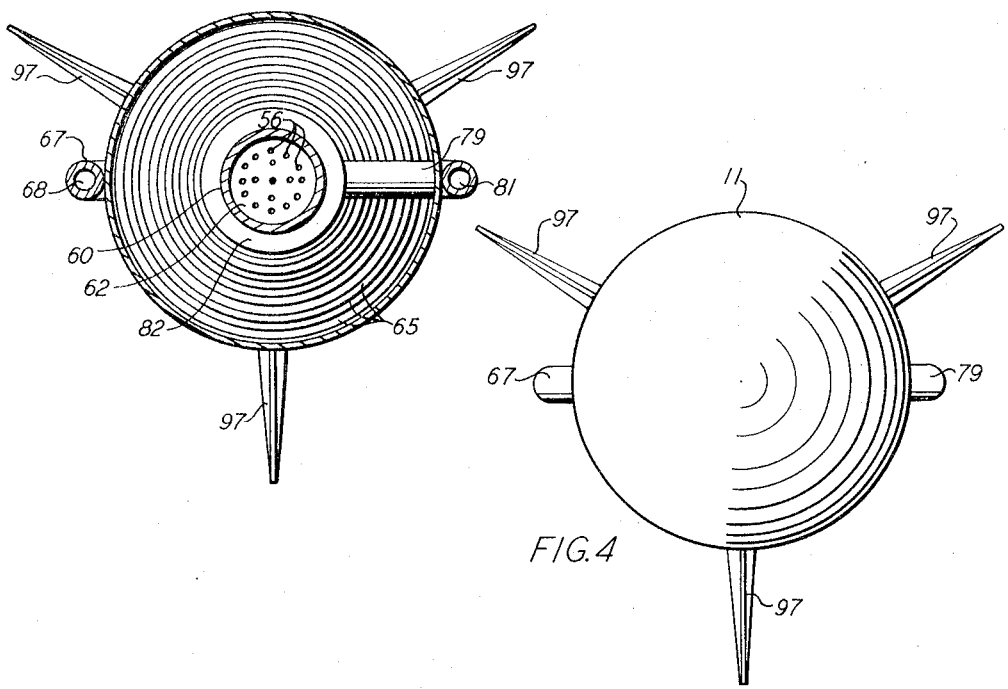
INVENTOR.
ROLF HEINZ WERNER KROEKEL
BY
William Frederick Werner
ATTORNEY

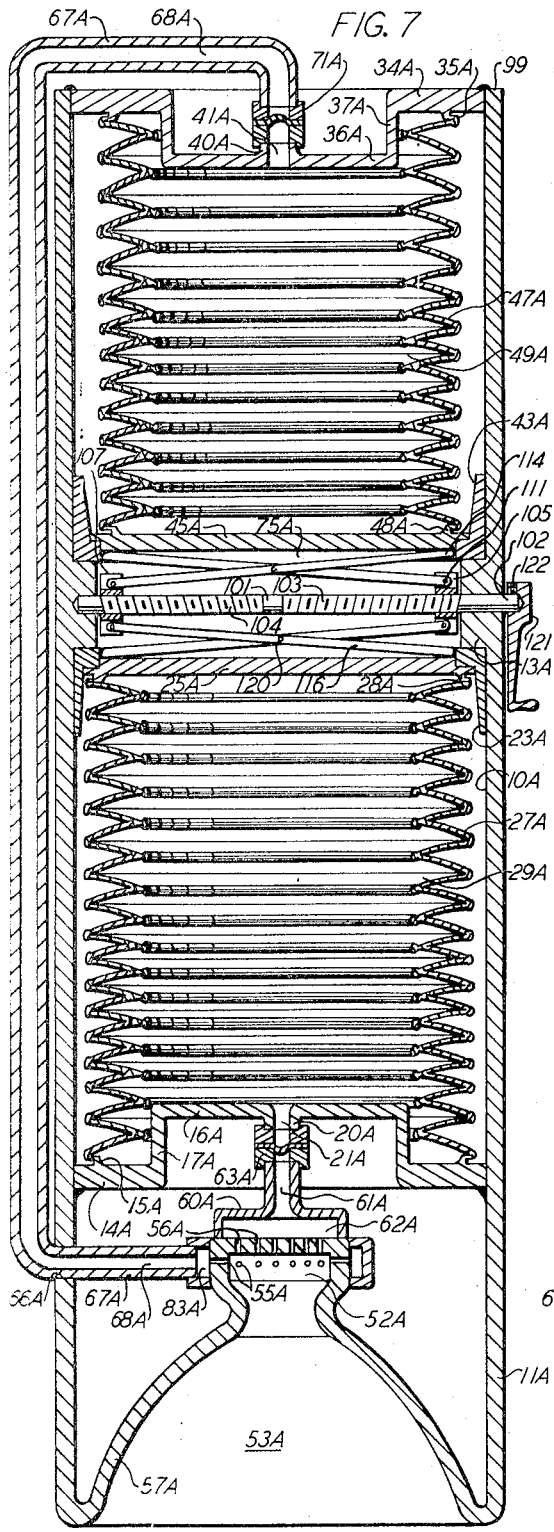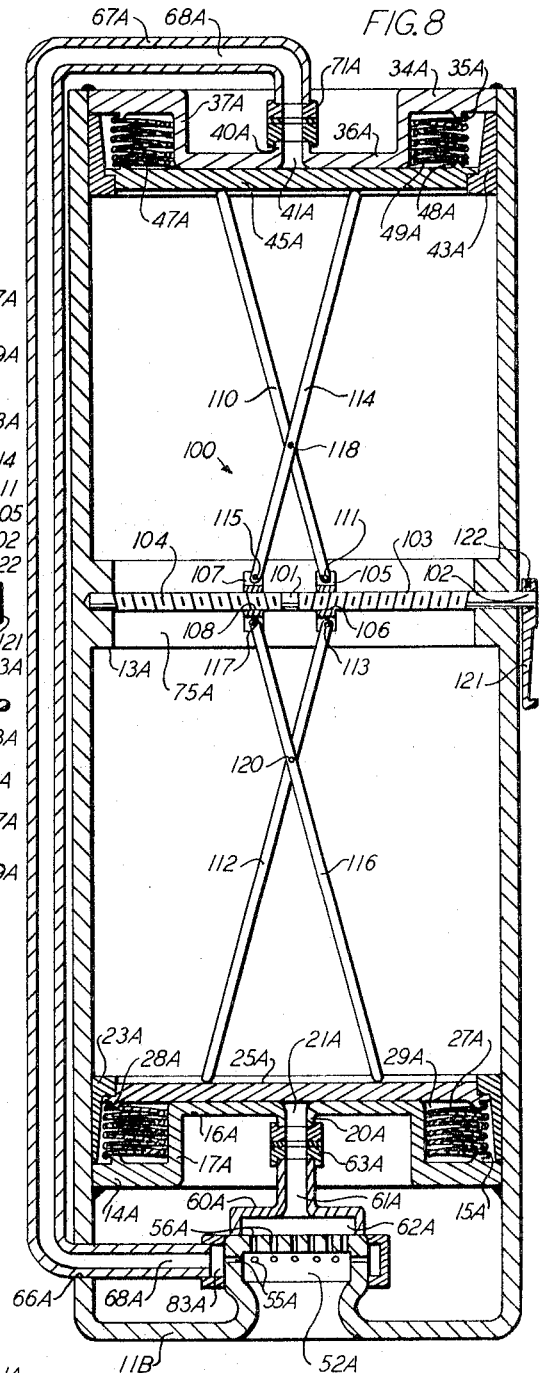

United States Patent Office 3,296,803
Patented Jan. 10, 1967

3,296,803
STORAGE TANK FOR DISCHARGING
FLUIDS IN A BLEND
Rolf Heinz Werner Kroekel, West Greenwich, R.I., assignor to Sealol, Inc., Warwick, R.I., a corporation of Delaware
Filed May 20, 1963, Ser. No. 281,414
7 Claims. (Cl. 60—259)

This invention relates to a tank housing oppositely located bellows and more particularly to a mechanism for simultaneously discharging the contents of the bellows through a mixing chamber and a common nozzle.

An object of the present invention is to provide a tank with a pair of bellows and the mechanism for simultaneously expelling the contents of the bellows under uniform pressure, through a mixing chamber and common nozzle.

Another object of the present invention is to provide a storage tank which is self compensating for thermal variations created by temperature changes.

Still another object of the present invention is to provide a rocket fuel tank with two separate fuel containers hermetically sealed and containing separate fuels which through a remote control mechanism actuates the containers to collapse them and thereby expell the fuel through a preheat unit into a combustion chamber and rocket nozzle, thereby to provide a rocket propellant expelled under uniform pressure from initial stage through the final fuel exhaust stage.

And still another object of the present invention is to provide a tank with oppositely located bellows and mechanism for collapsing the bellows simultaneously through the pressure combustion chamber gases.

Another object of the present invention is to provide a storage tank for rocket fuel which may be indefinitely stored and instantaneously actuated into a rocket propellant through a remote control device.

And another object of the present invention is to provide a tank for the storage of liquids with the means to prevent ullage.

And still another object of the present invention is to provide a tank with opposite located bellows and mechanism for collapsing the bellows under the influence of combustion chamber gases, which due to the difference in area of the piston heads and the effective area of the bellows, increases the hydraulic pressure on the bellows as they collapse to maintain the pressure on the expelling fuel as the volume of fuel in the bellow diminishes.

A further object of the present invention is to provide improved means for injecting into a combustion chamber proportional amounts of the mediums comprising the liquid fuel utilized in a jet propulsion system.

A still further object of the present invention is to provide storage means, for a prolonged period of time for both an oxidizing or catalyzing medium and a fuel medium, and means whereby no contact between the oxidizing or catalyzing medium and the fuel medium occurs until the instant of combustion and if desired the fuel medium may enter the combustion chamber in preheated form.

Other objects of the present invention will be pointed out in part and become apparent in part in the following specification and claims.

Referring to the drawings in which similar characters of reference indicate corresponding parts in all the figures:

FIGURE 3 is a perspective view of a rocket, with a remote control unit, housing the spaced bellows and fuel expelling mechanism.

FIGURE 4 is a plan view of FIGURE 3.

FIGURE 5 is a horizontal cross sectional view taken on line 5—5 of FIGURE 1.

FIGURE 6 is a horizontal cross sectional view taken on line 6—6 of FIGURE 1.

FIGURE 7 is a view similar to FIGURE 1, illustrating a modified form of mechanism for separating the piston heads and a modified form of shell.

FIGURE 8 is a view similar to FIGURE 7, illustrating still another modification in the construction of the shell and the collapsed condition of the bellows.

Figure 1:
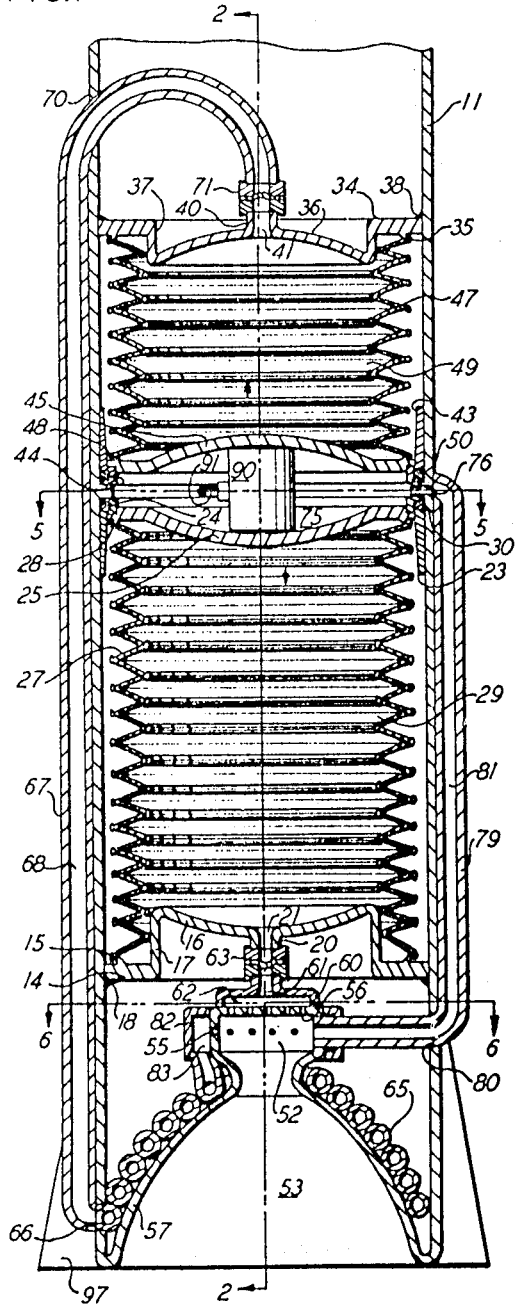
FIGURE 1 is a vertical medial cross sectional view through a tank with spaced bellows for expelling the contents thereof; showing the bellows in fuel storage condition.
Figure 2:
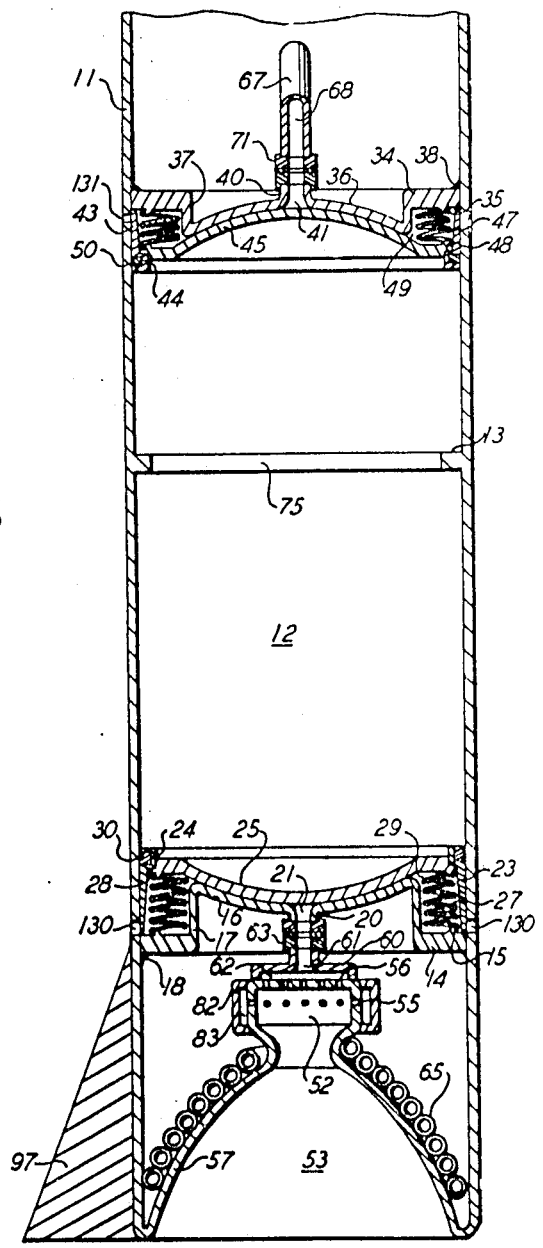
FIGURE 2 is a view taken on line 2—2 of FIGURE 1, showing the bellows after the fuel has been expelled.

Reference is now made to FIGURES 1 and 2 wherein a tank or shell 11, preferably made of steel and cylindrical in horizontal cross sectional area, provides a core 12 of preselected length. An internal flange 13 is provided on shell 11 for purposes which will presently appear (see FIGURE 2).

A lower or first bulkhead is provided comprising a rim 14 having a circular projection 15 and a dome 16 having a depending side 17 integrally connected to rim 14. Rim 14 is fastened to shell 11. As illustrated in FIGURES 1 and 2 the fastening means may be welding as at 18. Dome 16 is provided with a projection 20 having a (first) passageway 21.

A piston skirt 23 provided with a circular recess 24 is slidably mounted in shell 11. A piston head 25 is fastened to piston skirt 23. A bellows 27 is fastened on one end to piston head 25 at 28 and is fastened on the other end to rim 14 at circular projection 15. In this manner a collapsible fuel storage cavity 29 is provided. A piston ring 30 is housed in circular recess 24. Piston skirt 23, piston head 25 and piston ring 30 constitute a (first) piston slidably mounted in shell 11.

Similarly, an upper or second bulkhead is provided comprising a rim 34 having a circular projection 35 and a dome 36 having a depending side 37 integrally connected to rim 34. Rim 34 is fastened to shell 11, as by welding, as shown at 38. Dome 36 is provided with a projection 40 having a (second) passageway 41.

A piston skirt 43 provided with a circular recess 44 is slidably mounted in shell 11. A piston head 45 is fastened to piston skirt 43. A bellows 47 is fastened on one end to piston head 45 at 48 and is fastened on the other end to rim 34 at circular projection 35. A piston ring 50 is housed in circular recess 44. In this manner a second collapsible fuel storage cavity 49 is provided. Piston skirt 43, piston head 45 and piston ring 50 constitute a (second) piston slidably mounted in shell 11.

Shell 11 is provided with a contour which forms a combustion chamber 52 and a nozzle chamber 53. That portion of shell 11 forming the combustion chamber 52 is provided with horizontal ports 55 and vertical ports 56. That portion of shell 11 forming nozzle chamber 53 is designated as nozzle housing 57 combustion chamber 52 will be a blending or mixing chamber when non-combustible fluids are united therein.

A shield 60 overlying vertical ports 56 is fastened to the top of combustion chamber 52 to form a cell 62 having an entrance opening 61 aligned with (first) passageway 21. A valve means which may take the form of a burst diaphragm valve 63 is interposed and fastened between (first) passageway 21 and entrance opening 61. Burst diaphragm valve 63 prevents the contents housed in collapsible fuel storage cavity 29 from passing through (first) passageway 21 until a preselected pressure condition comes into being, as will hereinafter appear.

Shell 11 is provided with a perforation 66. A pipe coil 65 lies against, conforms to the contour of nozzle housing 57 and projects through perforation 66. A pipe 67 having an axial passageway 68 is fastened to shell 11 with axial passageway 68 in communication with pipe coil 65. Pipe coil 65 is fastened to nozzle housing 57. Pipe 67 passes through an opening in shell 11 at 70 and is goose necked or curved so as to connect axial passageway 68 with (second) passageway 41. A second valve means illustrated as a second burst diaphragm valve 71 is interposed and fastened between pipe 67 and projection 40. Second burst diaphragm valve 71 prevents the contents housed in second collapsible fuel storage cavity 49 from passing through (second) passageway 41.

Internal flange 13 prevents piston skirt 23 from abutting against piston skirt 43. Internal flange 13 therefore creates a spaced or chamber 75 between piston skirts 23 and 43 and between piston heads 25 and 45. To increase the area of space or chamber 75, piston heads 25, 45 may be curved away from each other, as illustrated in FIGURE 1.

Shell 11 and internal flange 13 are provided with a second perforation 76 (see FIG. 1). A pipe 79 having an axial passageway 81 is fastened to shell 11 with axial passageway 81 aligned with second perforation 76 at one end and is provided with a right angle bend to pass through an opening 80 in shell 11 on the other end. A second shield 82 is horizontally secured to shell 11 at combustion chamber 52 so as to form a chamber 83. Pipe 79 is fastened to shield 82 with axial passageway 81 in communication with combustion chamber 52.

A starter or box 90 containing an explosive ignitable by means of an electric spark is located in chamber 75 and is fastened to internal flange 13. Box 90 is provided with an electrical conduit 91 fastened to an electrical socket 92. A battery 93 and a switch 94 form an electrical circuit having lead wires 95, 96 attached to socket 92.

Shell 11 is provided with air escape orifices 130, 131 which vents core 12 to prevent entrapped air in core 12 from interferring with piston heads 25, 45 and piston skirts 23, 43 respectively, in their movement collapsing bellows 29, 49 respectively.

With reference to FIGURES 1 thru 6, it will be noted that in one form, shell 11 may bey a rocket casing provided with fins 97.

When the instant storage tank for discharging fluids in a blend is used as a rocket, hydrazine is stored in second collapsible fuel storage cavity 49 as the rocket fuel and nitrogen tetroxide is stored in cavity 29 as the oxidizing agent.

The closing of electrical switch 94 causes the explosive in box 90 to be discharged. The resulting explosion force piston heads 25 and 45 away from each other. The movement of the piston heads 25 and 45 in the direction of the, respective arrows, creates a pressure in the cavity 29 and in second collapsible fuel storage cavity 49 sufficient to rupture, respectively, burst diaphragm valve 63 and burst diaphragm valve 71, thereby expelling the contents of cavity 29 and second collapsible fuel storage cavity 49.

The oxidizing agent, nitrogen tetroxide will flow through passageway 21, entrance opening 61, cell 62, and vertical ports 56 into combustion chamber 52. Simultaneously, the fuel hydrazine will flow through passageway 41, axial passageway 68, pipe coil 65, chamber 83 and horizontal ports 55 into combustion chamber 52 where the fuel and oxidizer will mix and unite into an explosive rocket propellant charge. The uniting process in the combustion chamber 52 will heat nozzle housing 57 and pipe coil 65 to thereby pre-heat the fuel flowing through pipe coil 65. Axial passageway 81 will permit a small but sufficient amount of the exploded gases in combustion chamber 52 to pass into chamber 75 and thereby uniformly increase the pressure acting on piston heads 25, 45 to further force said piston heads 25, 45 in the direction of the, respective, arrows. In this manner piston head 25, 45 collapse, respectively, bellows 27 and 47 to expel the contents in cavities 29 and 49, respectively.

The diameters of the bellows and the lengths of the bellows may be varied to vary the ratio of the contents of one bellows in relation to the other bellows.

Reference is directed to FIGURE 7 wherein shell 11A is a tube provided with an internal flange 13A. A lower bulkhead is provided comprising a rim 14A having a circular projection 15A, and a dome 16A having a depending side 17A. Rim 14A is fastened to shell 11A as by welding. Dome 16A is provided with a projection 20A having a passageway 21A.

A piston skirt 23A is slidably mounted on the inside wall 10A of shell 11A. A piston head 25A is fastened to piston skirt 23A as by welding. A bellows 27A is fastened on one end to piston head 25A at 28A and on the opposite end bellows 27A is fastened to circular projection 15A as by welding. In this manner a collapsible fuel storage cavity 29A is provided. Piston skirt 23A and piston head 25A constitute a piston.

Similarly, an upper bulkhead is provided comprising a rim 34A having a circular projection 35A and a dome 36A having a depending side 37A connected to rim 34A. Rim 34A is fastened to shell 11A, as by welding. Dome 36A is provided with a projection 40A having a passageway 41A.

A piston skirt 43A is slidably mounted on the inside wall 10A of shell 11A. A piston head 45A is fastened to piston skirt 43A. A bellows 47A is fastened on one end to piston head 45A at 48A and is fastened on the other end to rim 34A at circular projection 35A. In this manner a second collapsible fuel storage cavity 49A is provided. Piston skirt 43A and piston head 45A constitute a piston.

Shell 11A is provided with a contour which forms a combustion chamber 52A and a nozzle chamber 53A. That portion of shell 11A forming combustion chamber 52A is provided with horizontal ports 55A and vertical ports 56A. The portion of shell 11A forming nozzle chamber 53A is designated as nozzle housing 57A.

A shield 60A overlying vertical ports 56A is fastened to the top portion of shell 11A to form a cell 62A having an entrance opening 61A aligned with passageway 21A. A valve means, illustrated as a burst diaphragm valve 63A is interposed and fastened between projection 20A and entrance opening 61A. Burst diaphragm valve 63 prevents the contents housed in collapsible storage cavity 29 from passing through passageway 21 until a preselected pressure condition comes into being, as will hereinafter appear.

Shell 11A is provided with a perforation 66A. A pipe 67A having an axial passageway 68A is fastened to shell 11A, passes through perforation 66A with axial passageway 68A in communication with chamber 83A. In FIGURE 7 shell 11A terminates at 99. Pipe 67A is goose necked or bent so as to connect axial passageway 48A with passageway 41A. A second valve means, illustrated as a second burst diaphragm valve 71A is interposed and fastened between pipe 67A and projection 40A. Valve 71A prevents the contents housed in second collapsible storage cavity 49A from passing through passageway 41A.

Internal flange 13A prevents piston skirts 23A from abutting against piston skirt 43A. Internal flange 13A therefore creates a space or chamber 75A between piston skirts 23A and 43A and between piston heads 25A and 45A.

A scissor jack, generally indicated by reference numeral 100, is located in chamber 75A and constructed as follows:

A shaft 101 is rotatively mounted on opposite ends in internal flange 13A with a portion 102 of shaft 101 extending outside and beyond shell 11A. Shaft 101 is provided with a right hand screw thread 103 and a left hand screw thread 104. A block 105 provided axially with a right hand screw thread 106 is mounted for sliding movement along right hand screw thread 103. Similarly, a block 107 provided axially with a left hand screw thread 108 is mounted for movement along left hand screw thread 104. A lever 110 is pivotally mounted to block 105 at 111. A lever 112 is pivotally mounted to block 105 at 113. A lever 114 is pivotally mounted to block 107 at 115. A lever 116 is pivotally mounted to block 107 at 117. Levers 110 and 114 are pivotally connected at 118. Levers 112 and 116 are pivotally connected at 120. Means, illustrated as a manually operated handle 121, fastened to shaft 101 by means of a set screw 122, rotates shaft 101 and thereby moves blocks 105, 107 toward or away from each other to extend or retract levers 110, 114 and levers 112, 116 respectively. A motor or other means of power may be employed to rotate shaft 101.

The extension of levers 110, 114 and 112, 116 forces piston heads 25A, 45A away from each other, thereby creating a pressure force in cavities 29A, 49A until burst diaphragm valves 63A, 71A break and allow the contents of the respective storage cavities 29A, 49A to simultaneously pass through passageways 21A and 41A, as previously described for the form illustrated in FIGURES 1 and 2.

The form of shell 11B illustrated in FIGURE 8 is constructed to eliminate nozzle chamber 53A. In other respects FIGURE 8 conforms to the construction illustrated in FIGURE 7, with the bellows 27A, 47A shown in collapsed position.

Applicant has therefore provided a tank or shell 11 in the form of a rocket as illustrated in FIGURES 1 thru 6 or in the form of a storage tank, shell 11A and 11B, FIGURES 7 and 8 respectively.

In either case the shell is provided with an internal flange, upper and lower bulkheads and collapsible storage cavities in the form of bellows. Each bellows is provided with a piston which collapses the bellows. Valve means at the bulkheads retain the contents within the bellows or allow the contents to be expelled from the bellows. An explosive charge or mechanical means is employed to move the pistons. A pre-heat coil may be employed or not employed as conditions warrant. Escaping fluid especially gases when employed may be piped back into the space provided by the internal flange to assist in the separation of the piston heads from each other. The bellows as storage cavities permit thermal movement of the stored material due to variations in temperature.

Having shown and described preferred embodiments of the present invention, by way of example, it should be realized that structural changes could be made and other examples given without departing from either the spirit or scope of this invention.

What I claim is:

1. A storage tank for discharging fluids in a blend comprising a shell, a first piston slidably mounted in said shell, a bulkhead provided with a first passageway, means securing said bulkhead to said shell, a bellows fastened on one end to said piston and on the other end to said bulkhead to form a first collapsible fluid storage cavity, a second piston slidably mounted in said shell, a second bulkhead provided with a second passageway, means securing said second bulkhead to said shell, a second bellows fastened on one end to said second piston and on the other end to said second bulkhead to form a second collapsible fluid storage cavity, means forming a chamber between said first mentioned piston and said second piston, means located in said chamber for actuating said first piston toward said first bulkhead and second piston toward said second bulkhead to discharge the contents of said first collapsible fluid storage cavity and said second collapsible fluid storage cavity, respectively, said shell having a wall forming a fluid blending chamber, horizontal and vertical ports in said wall, a shield having an entrance opening overlying said vertical ports, means fastening said shield to said wall and providing a cell between said entrance opening and said vertical ports, a first burst diaphragm valve interposed and fastened between said first passageway and said entrance opening, a second shield fastened to said wall and forming a second chamber around said horizontal ports, a pipe provided with an axial passageway, a second burst diaphragm valve interposed between said pipe and said second passageway with said second burst diaphragm blocking communication between said second passageway and said axial passageway, and means connecting said pipe and axial passageway with said last mentioned chamber whereby upon movement of said first piston and second piston away from each other fluid, in said first collapsible fluid storage cavity and in said second collapsible fluid storage cavity will break said first burst diaphragm valve and said second burst diaphragm valve to allow fluid in said first collapsible fluid storage cavity to flow through said entrance opening into said cell and through said vertical ports into said blending chamber and fluid in said second collapsible fluid storage cavity to flow through said second passageway into and through said axial passageway and horizontal ports to said blending chamber, and feedback conduit means providing communication between said first mentioned chamber and said blending chamber for assisting said piston actuating means.

2. A storage tank for discharging fluids in a blend comprising a shell, a first piston slidably mounted in said shell, a first bulkhead provided with a first passageway, means securing said first bulkhead to said shell, a first bellows fastened on one end to said first piston and on the other end to said first bulkhead to form a first collapsible fluid storage cavity, a second piston slidably mounted in said shell, a second bulkhead provided with a second passageway, means securing said second bulkhead to said shell, a second bellows fastened on one end to said second piston and on the other end to said second bulkhead to form a second collapsible fluid storage cavity, means a first chamber between said first piston and said second piston, said shell having a contour to provide a combustion chamber and a nozzle chamber, said shell at said combustion chamber having a plurality of vertical ports and a plurality of horizontal ports, a first shield having an entrance opening overlying said vertical ports, means fastening said shield to said shell at said combustion chamber to provide a cell between said entrance opening and said vertical ports, a first burst diaphragm valve interposed and fastened between said first passageway and said entrance opening, a second shield, means fastening said second shield to said shell to form a second chamber around said horizontal ports, a pipe provided with an axial passageway, a second burst diaphragm valve interposed and fastened between said pipe and axial passageway and said second passageway, said second burst diaphragm valve blocking communication between said second passageway and said axial passageway, means connecting said pipe and axial passageway with said second chamber, means located in said first chamber for actuating said first piston toward said first bulkhead and said second piston toward said second bulkhead to discharge the contents of said first collapsible fluid storage cavity and the contents of said second collapsible fluid storage cavity, respectively, through said first burst diaphragm valve and through said second burst diaphragm valve, respectively, to said combustion chamber, and feedback conduit means providing communication between said first chamber and said combustion chamber for assisting said piston actuation means.

3. A storage tank for discharging fluids in a blend comprising a shell, a first piston slidably mounted in said shell, a first bulkhead, provided with a first passageway, secured in said shell, a first bellows fastened on one end to said first piston and fastened on the other end to said first bulkhead to form a first collapsible fluid storage cavity, a second piston slidably mounted in said shell, a second bulkhead, provided with a second passageway, secured in said shell, a second bellows fastened on one end to said second piston and fastened on the other end to said second bulkhead to form a second collapsible fluid storage cavity, an internal flange fastened to said shell separating said first piston from said second piston and thereby providing a space between said first piston and said second piston, said shell having a contour to provide a blending chamber, a first means connecting said first passageway with said blending chamber, a second means connecting said second passageway with said blending chamber, a first valve means located in said first passageway, a second valve means located in said second passageway, and a third means located in said space, acting simultaneously on said first piston and said second piston to move said first piston and said second piston away from each other to simultaneously collapse said first bellows and said second bellows, respectively, and feedback conduit means providing communication between said space and said blending chamber for assisting said third means.

4. A storage tank for discharging fluids in a blend comprising a shell, a first piston slidably mounted in said shell, a first bulkhead provided with a first passageway, means securing said first bulkhead to said shell, a first bellows fastened on one end to said first piston and on the other end to said first bulkhead to provide a first collapsible fluid storage cavity, a second piston slidably mounted in said shell, a second bulkhead provided with a second passageway, means securing said second bulkhead to said shell, a second bellows fastened on one end to said second piston and on the other end to said second bulkhead to provide a second collapsible fluid storage cavity, said shell having an internal flange separating said first piston from said second piston and thereby providing a space between said first piston and said second piston, said shell having a contour to provide a combustion chamber having a plurality of vertical ports and plurality of horizontal ports, a first shield, having an entrance opening, overlying said vertical ports, means fastening said shield to said shell at said combustion chamber to provide a cell between said entrance opening and said vertical ports, a first valve means interposed and fastened between said first passageway and said entrance opening, a second shield, means fastening said second shield to said shell to form a second chamber around said horizontal ports, a pipe provided with an axial passageway, a second valve means interposed and fastened between said pipe and axial passageway and said second passageway, means connecting said pipe and axial passageway with said second chamber, a shaft located in said space, provided with a right hand thread and a left hand thread, and rotatively mounted on opposite ends in said internal flange, a first block provided axially with a right hand thread slidingly mounted upon said right hand thread on said shaft, a second block provided axially with a left hand thread slidingly mounted upon said left hand thread on said shaft, a first lever pivotally mounted to said first block and slidingly engaging said first piston, a second lever pivotally mounted to said second block and pivotally connected to said first lever and slidingly engaging said first piston, a third lever pivotally connected to said first block and slidingly engaging said second piston, a fourth lever pivotally connected to said second block and pivotally connected to said third lever and slidingly engaging said second piston, means rotating said shaft whereby said first piston and said second piston move away from each other.

5. A storage tank for discharging fluids in a blend comprising a shell, a first piston slidably mounted in said shell, a first bulkhead provided with a first passageway, means securing said bulkhead to said shell, a first bellows fastened on one end to said piston and on the other end to said bulkhead to form a collapsible fluid storage cavity, a second piston slidably mounted in said shell, a second bulkhead provided with a second passageway, means securing said second bulkhead to said shell, a second bellows fastened on one end to said second piston and on the other end to said second bulkhead to form a second collapsible fluid storage cavity, said shell having an internal flange separating said first piston from said second piston and thereby providing a space between said first piston and said second piston, said shell having a contour to provide a combustion chamber and a nozzle chamber, said shell at said combustion chamber having a plurality of vertical ports and a plurality of horizontal ports, a first shield, having an entrance opening, overlying said vertical ports, means fastening said shield to said shell at said combustion chamber to provide a cell between said entrance opening and said vertical ports, a first burst diaphragm valve interposed and fastened between said first passageway and said entrance opening, a second shield, means fastening said second shield to said shell to form a second chamber around said horizontal ports, a pipe coil, means fastening said pipe coil to said shell at said nozzle chamber, one end of said coil being in communication with said second chamber, a pipe provided with an axial passageway, a second burst diaphragm valve interposed and fastened between said pipe and axial passageway and said second passageway, means connecting said pipe and axial passageway with said pipe coil, a perforation in said shell and in said internal flange, a second pipe provided with an axial passageway fastened to said shell with said last mentioned axial passageway in communication with said perforation and said space and with said combustion chamber, an explosive charge fastened to said internal flange and located in said space, and means for igniting said explosive charge, whereby said first piston and said second piston move away from each other.

6. A storage tank for discharging fluids in a blend comprising a shell, a piston slidably mounted in said shell, a bulkhead provided with a passageway, means securing said bulkhead to said shell, a bellows fastened on one end to said piston and on the other end to said bulkhead to form a collapsible fluid storage cavity, a second piston slidably mounted in said shell, a second bulkhead provided with an axial bore, means securing said second bulkhead to said shell, a second bellows fastened on one end to said second piston and on the other end to said second bulkhead to form a second collapsible fluid storage cavity, said shell having an internal flange separating said first piston from said second piston and thereby providing a space therebetween, said shell having a contour to provide a combustion chamber, said shell at said combustion chamber having a plurality of vertical ports and a plurality of horizontal ports, a first shield, having an entrance opening, overlying said vertical ports, means fastening said shield to said shell at said combustion chamber to provide a cell between said entrance opening and said vertical ports, a first valve means interposed between said first passageway and said entrance opening, a second shield, means fastening said second shield to said shell to form a second chamber around said horizontal ports, a pipe provided with an axial passageway, a second valve means interposed between said pipe and axial passageway and said second passageway, means connecting said pipe and axial passageway with said second chamber, a perforation in said shell and in said internal flange, a second pipe provided with an axial passageway fastened to said shell with said last mentioned axial passageway in communication with said perforation and said space and with said combustion chamber, and means for simultaneously moving said first piston and said second piston away from each other and for simultaneously actuating said first valve means and said second valve means.

7. A storage tank for discharging fluid in a blend comprising a shell, a first piston slidably mounted in said shell, a bulkhead provided with a first passageway, means securing said bulkhead to said shell, a bellows fastened on one end to said piston and on the other end to said bulkhead to form a collapsible fluid storage cavity, a second piston slidably mounted in said shell, a second bulkhead provided with a second passageway, means securing said second bulkhead to said shell, a second bellows fastened on one end to said second piston and on the other end to said second bulkhead to form a second collapsible fluid storage cavity, said first and second bellows each having an effective pressure area, said first and second pistons each having an effective pressure area, the effective pressure area of said first bellows being less than the effective pressure area of said first piston and the effective pressure area of said second bellows being less than the effective pressure area of said second piston, said shell having an internal flange means separating said first piston from said second piston and thereby providing a space therebetween, a combustion chamber, means fastening said combustion chamber to said shell, said combustion chamber having a plurality of vertical ports and a plurality of horizontal ports, a first shield having an entrance opening overlying said vertical ports, means fastening said shield to said shell at said combustion chamber to provide a cell between said entrance opening and said vertical ports, a first valve means having a pressure responsive means, interposed between said first passageway and said entrance opening, a second shield, means fastening said second shield to said combustion chamber to form a second chamber around said horizontal ports, said shell having a plurality of air escape orifices for venting said shell opposite said first bellows and said second bellows to the atmosphere, a pipe provided with an axial passageway, a second valve means having a pressure responsive means interposed between said axial passageway and said second passageway, means connecting said pipe and axial passageway with said second chamber, a perforation in said shell leading into said space, a second pipe provided with a second axial passageway and fastened to said shell with said second axial passageway in communication with said perforation and with said combustion chamber, and explosive means located in said space for simultaneously moving said first piston and said second piston away from each other thereby increasing the pressure in said first and second collapsible fluid storage cavities thereby simultaneously actuating the pressure responsive means in said first and second valve means, responsive to the increase of pressure in said first and second collapsible fluid storage cavities, respectively, to actuate said first and second valve means from closed to open position whereby the fluids from said first and said second collapsible fluid storage cavities form a combustible mixture in said combustion chamber with the resultant gas from the combustion mixture flowing through said second axial passageway to said space to act simultaneously upon said first and second pistons.

References Cited by the Examiner
UNITED STATES PATENTS

| | | | |
|---|---|---|---|
| 1,235,550 | 8/1917 | Carmody | 222—386.5 |
| 2,505,798 | 6/1946 | Skinner. | |
| 2,697,483 | 12/1954 | Stanley. | |
| 2,959,004 | 11/1960 | Greiner | 60—39.48 |
| 3,077,073 | 2/1963 | Kuhrt. | |
| 3,085,394 | 4/1963 | Handley | 60—39.74 X |
| 3,133,410 | 5/1964 | Gessner | 60—39.47 X |
| 3,150,485 | 9/1964 | Hickerson. | |
| 3,180,089 | 4/1965 | Dodge | 60—39.48 |

MARK NEWMAN, *Primary Examiner.*

D. HART, *Assistant Examiner.*